No. 729,469. PATENTED MAY 26, 1903.
E. W. WILLIAMS & J. H. L. TREVORROW.
BORING TOOL.
APPLICATION FILED NOV. 1, 1902.
NO MODEL. 2 SHEETS—SHEET 1.
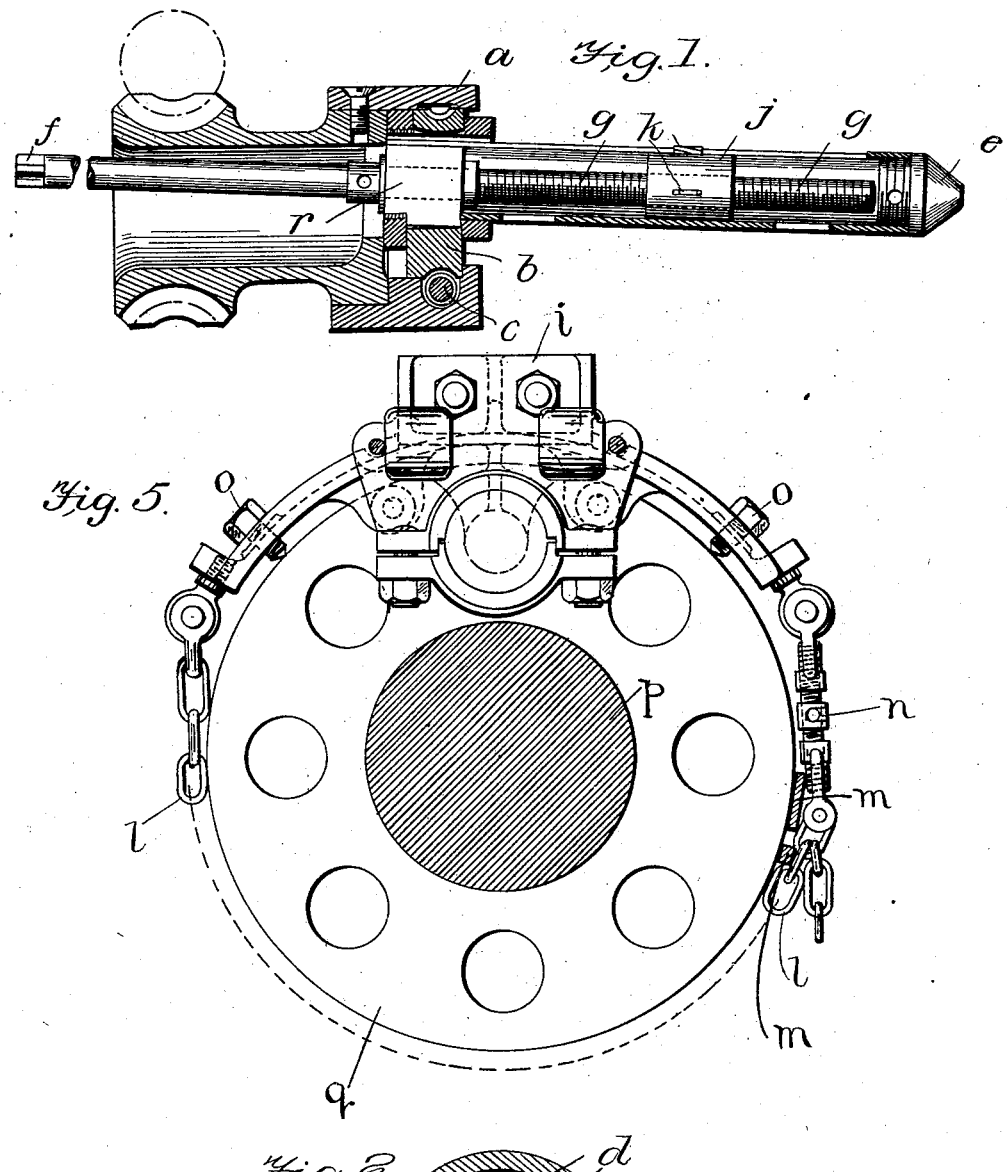

No. 729,469. PATENTED MAY 26, 1903.
E. W. WILLIAMS & J. H. L. TREVORROW.
BORING TOOL.
APPLICATION FILED NOV. 1, 1902.
NO MODEL. 2 SHEETS—SHEET 2.
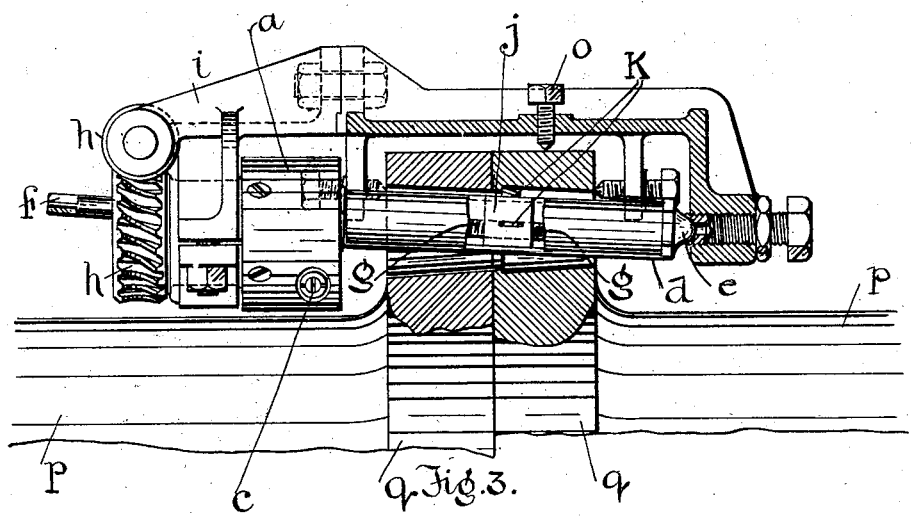
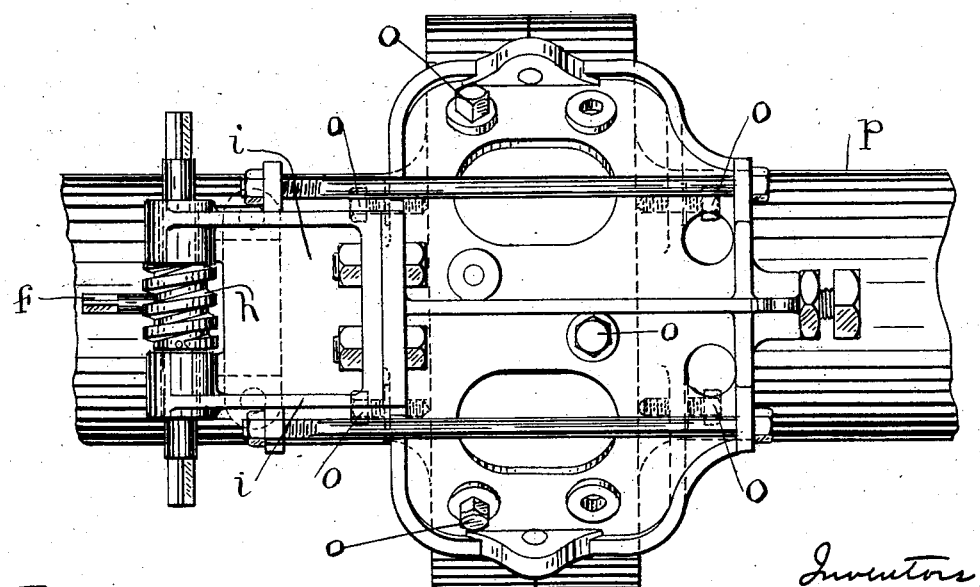

No. 729,469.

Patented May 26, 1903.

UNITED STATES PATENT OFFICE.

EDGAR WILLIAM WILLIAMS AND JOSEPH HICKS LANGFORD TREVORROW, OF NEWPORT, ENGLAND.

BORING-TOOL.

SPECIFICATION forming part of Letters Patent No. 729,469, dated May 26, 1903.

Application filed November 1, 1902. Serial No. 129,733. (No model.)

*To all whom it may concern:*

Be it known that we, EDGAR WILLIAM WILLIAMS and JOSEPH HICKS LANGFORD TREVORROW, subjects of the King of England, residing at 77 Caerleon road, Newport, in the county of Monmouth, England, have invented certain new and useful Improvements in Boring-Tools; and we do hereby declare the following to be a full, clear, and exact description of the invention, such as will enable others skilled in the art to which it appertains to make and use the same.

This invention relates to improved mechanism for converting ordinary or cylindrical holes into taper holes or for altering the taper of taper holes, the same mechanism also furnishing an adjustable eccentric device applicable to other purposes.

The mechanism is especially adapted to be fixed to the coupling-flanges of any shafts (more especially tunnel-shafts in steamers) for the purpose of boring out the taper bolt-holes while the shafts are in position. Thus any desired taper may be made to suit any bolts to be replaced.

The mechanism consists of a cylindrical body with an internal eccentric, said eccentric being provided with teeth on its periphery and adjusted by means of a worm engaging in same, all inclosed in an eccentric opening in above-mentioned cylindrical body. Attached eccentrically to the above-named eccentric is a boring-bar, one end of same being carried on a center and the other supported in the said cylindrical body. Suitable driving mechanism is provided.

In the accompanying drawings, Figure 1 is a longitudinal section of our boring mechanism, parts being shown in elevation; and Fig. 2 is a cross-section of the same. Figs. 3, 4, and 5 show the general arrangement of the mechanism as in position for boring bolt-holes in two abutting shaft-flanges, Fig. 3 being a side view, Fig. 4 a plan, and Fig. 5 an end view, the boring-bar not being shown in Fig. 5.

The same letters of reference denote the same parts in all the views.

*a* shows cylindrical body; *b*, toothed eccentric within same; *c*, worm engaging with said eccentric *b* in order to turn same, and thus adjust taper.

*d* is the boring-bar, attached eccentrically to the eccentric *b*. One end of the boring-bar *d* is carried on a center *e*, and the other end is supported in and carried through the cylindrical body *a*. This boring-bar is supported in the cylindrical body *a*, and at the end *f* of the central leading-screw *g* a quadrant and change-wheels may be fitted for feed motion, or hand or ordinary self-acting motion may be adopted. *h* shows worm-gearing for working. The loose bracket *i*, which carries the driving end, allows of the boring-bar being placed in and taken out of position for working. *j* shows the tool-holder, and *k* the cutters. The screw *g* passes through a block *r*, secured in the eccentric *b*, as shown in Fig. 1.

Referring to Figs. 3, 4, and 5, it will be seen that the whole device is placed in position on the work and held therein by a chain *l*, wedges *m*, straining-screw *n*, and adjusting-pins *o*. The boring-bar is passed through the existing bolt-hole and the taper adjusted by means of the eccentric mechanism. In these views, *p p* show lengths of shafting, and *q q* coupling-flanges.

What we claim, and desire to secure by Letters Patent of the United States of America, is—

1. A boring-tool consisting of a cylindrical body having a circular opening eccentrically located therein, an eccentrically-mounted boring-bar in said opening, and means for adjusting said bar in said opening, substantially as described.

2. A boring-tool consisting of a cylindrical body having an eccentric opening therein, a toothed eccentric mounted therein, a boring-bar carried by said eccentric, and worm-gearing engaging with the teeth on said eccentric, substantially as described.

3. The combination with a boring-tool consisting of a cylindrical body having a circular opening eccentrically located therein, an eccentric mounted in said opening, a boring-bar carried by said eccentric, and means for adjusting said eccentric in said opening, of means for driving said boring-tool and feeding it forward, substantially as described.

In testimony whereof we affix our signatures in presence of two witnesses.

EDGAR WILLIAM WILLIAMS.
JOSEPH HICKS LANGFORD TREVORROW.

Witnesses:
HENRY B. BIRCH,
JNO. J. BURNELL.